United States Patent Office 3,420,085
Patented Jan. 7, 1969

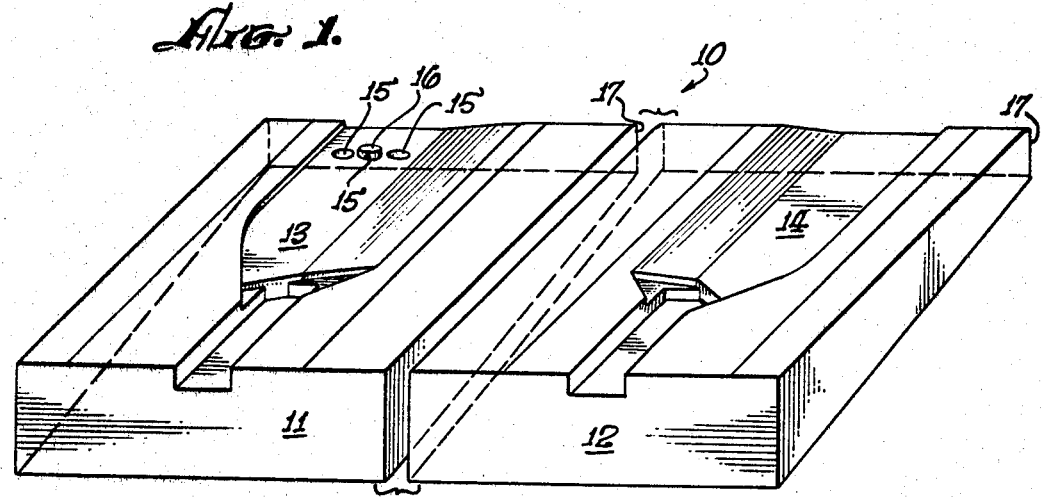
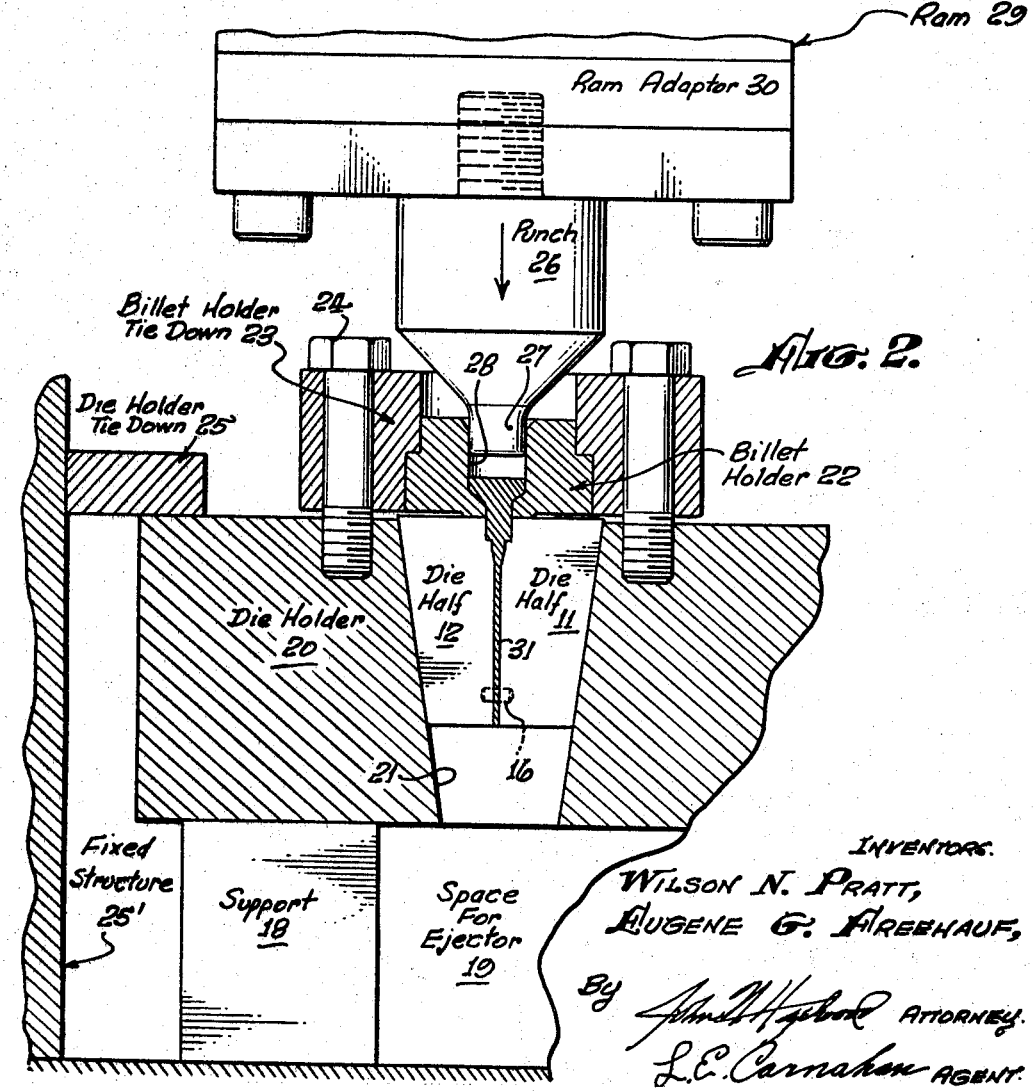

3,420,085
METAL EXTRUSION FORMING APPARATUS
Wilson N. Pratt, Anaheim, and Eugene G. Freehauf, Ontario, Calif., assignors to General Dynamics Corporation, a corporation of Delaware
Filed Dec. 1, 1965, Ser. No. 510,903
U.S. Cl. 72—253                10 Claims
Int. Cl. B21c 23/00

ABSTRACT OF THE DISCLOSURE

Broadly, the disclosure involves the use of a pin or projection extending through a vent or opening in a die cavity below the cavity area defining the desired part to be formed. The die being particularly adapted for use in a high energy rate forming apparatus which is capable of forming a three dimensional object by a single stroke of the forming apparatus. The projection or pin extends transversely to the direction of flow of material through the vent for purposes of impeding flow of material through the die cavity without closing the vent, whereby the material will be caused to flow in a transverse sense during the extrusion process enabling the die to be completely filled without the need for excessive back pressure on the material being extruded. The exact location of the pin is dependent on the specific item being formed to create back pressure in the areas needed so that the material being extruded fully fills the die cavity without damage to either the formed part or the forming die.

---

This invention relates to the forming of parts, particularly to the forming of three dimensional parts by high energy rate forming apparatus, and more particularly to a means for controlling back pressure in three dimensional part extrusion utilizing a split type die.

High performance missiles, spacecraft and aircraft require the ultimate in structural part design and fabrication. Designers can envisage optimum systems and parts, but are forced by technological limitations to compromise their designs of parts and systems to compensate for producibility aspects.

It has been the conventional practice to form three dimensional parts from stock by machining operations which involve the removal of a substantial amount of metal in the defining of geometrical features of the part. This procedure is not only wasteful of material but is also time consuming and, accordingly, expensive.

A process, and apparatus for carrying out the process, for forming precision metal parts directly from a billet or briquette by a high energy rate force, thus greatly advancing the known technology, is described and claimed in copending U.S. patent application Ser. No. 427,665, and assigned to the assignee of this invention. The present invention is directed to an improved die which serves to control the back pressure in three dimensional part extrusion while controlling the flash in a split die, thus producing a part with lower fire pressure of the high energy rate apparatus. Thus, this invention assures the consistent and rapid production of substantially finished, high quality parts of a wide variety of shapes and sizes, in one operation, utilizing a variety of metals and alloys. Tests have shown that this invention is effective in producing three dimensional parts from billets of either solid or powered material when formed by a high energy rate apparatus.

Therefore, it is an object of this invention to provide an extrusion forming means.

Another object of the invention is to provide a means for extrusion forming three dimensional parts.

Another object of the invention is to provide a means for controlling back pressure in three dimensional part extrusion in a split die.

Another object of the invention is to provide a split die for high energy rate extrusion forming apparatus which includes means for controlling back pressure within the die.

Other objects will become readily apparent from the following description and accompanying drawings wherein:

FIG. 1 is a perspective view showing an embodiment of a split die incorporating the invention; and FIG. 2 is a view partially in cross section illustrating the FIG. 1 die embodiment positioned in a portion of a high energy rate forming apparatus.

In the manufacture of parts, such as the aerodynamic control surfaces of a missile, much effort and many methods have been tried in order to produce such parts inexpensively. The most satisfactory method known is the utilization of high energy rate forming apparatus as exemplified by the apparatus disclosed in the above mentioned application. Since the conception of the process and apparatus encompassed by the above identified application, much effort has been directed to high energy rate extrusion of parts from billets of powder metal and from solid steel billets. The ability of an extruded billet to fill a die accurately is related to back pressure of the die surface which causes the metal being extruded to move at right angles to the direction of normal flow. Experiments on prior known devices have been conducted in which the bottom of the die was closed or vented by very small openings to produce back pressure and thus fill the die. These experiments clearly demonstrated that this method of producing back pressure was not effective and that very high pressures were necessary to fill the die thus resulting in extreme flash of the extruding material between the sections of the die, thereby increasing the wear on the tooling utilized.

Further experiments were conducted to determine the flow characteristics of various materials wherein the bottom of the die was relieved so as to provide no back pressure except for the discharge orifice. It was noted that most of the materials extruded very well but formed none of the actual contours of the die cavity.

It was decided to position a pin in the discharge orifice of the die cavity to impede the flow of the material being extruded. Tests were conducted with such a pin arrangement and it was found that excellent fills of the die cavity contours were made with many different materials. Utilizing this discovery, further tests were conducted and it was found that by positioning the pin in different locations in the die cavity discharge orifice, or changing the pin configuration, the flow would be impeded more in one area than another, thus enabling various shaped parts to be formed by a single blow of the forming apparatus. Thus, tests have proven the concept of this invention wherein impeding the flow of metal in a die by using a pin or shaped projection controls the back pressure so that the die cavity is filled without excessive pressure buildup which results in flash and tool wear, thereby providing a substantially finished three dimensional part.

Referring now to the drawings, FIG. 1 shows a split die 10 comprising halves 11 and 12. Each of the halves 11 and 12 include a cavity 13 and 14, respectively, defining the contours of the part to be formed. In this embodiment cavities 13 and 14 are mirror images of each other except that cavity 13 is provided with a plurality (3 in this embodiment) of pin support holes 15, a flow impeding pin 16 being positioned in the central hole 15. However, pin 16 may be supported by both die halves 11 and 12 by providing cavity 14 of half 12 with mating holes 15 (not shown) and making the pin 16 of sufficient length to extend thereinto. With this arrangement, pin 16 would also serve as a means for aligning die halves 11 and 12. While die cavities 13 and 14 are illustrated as being mirror images, they may be configured differently to define any configuration of a part to be formed. Thus, the location of the pin support holes 15 and the flow impeding pin or other configured projection would be dependent on the configuration of the part to be formed. Also, if required, more than one pin 16 may be utilized. The die cavity configurations of die halves 11 and 12 are defined to produce an aerodynamic control surface for a missile, similar to, but of a slightly different configuration than, the control surface illustrated in the above mentioned copending patent application.

As shown in FIG. 1 die halves 11 and 12 are tapered toward end 17 to cooperate with and be held in the high energy rate forming apparatus partially illustrated in FIG. 2. The high energy rate forming (H.E.R.F.) apparatus may be of the type commercially known as "Dynapak" and manufactured by the assignee of this application and described, for example, in U.S. Patents 2,925,803; 3,036,538 and 3,093,117, or in the above identified patent application. H.E.R.F. apparatus as defined herein is a forming apparatus which utilizes a high energy power source for driving the ram unit thereof at a high velocity rate. For example, the energy used to form control surfaces configured by the die 10 is approximately 42,500 inch pounds applied to the heated billet at a velocity of 250 in./sec. The larger part being formed, the higher the required pressure, and high pressures require higher velocities where the mass of the ram is constant. Thus, with various types of forming apparatus and/or various types of parts being formed, the energy will vary, and it is the energy applied over a certain period of time which produces the formed article. The velocity of the ram unit of the apparatus is important because of its being a square function as illustrated by the formulas $$E = WV^2/2G$$

or $E = MV^2$ in which:

E = energy
W = weight
V = velocity
G = gravity
M = mass

The forming of a three dimensional article or part from a billet of material consists essentially of four operations; namely, heating the billet, transferring the heated billet to the die of the H.E.R.F. apparatus, forming the article by actuating (firing) the H.E.R.F. apparatus, and removing the formed article.

Referring now to FIG. 2, the H.E.R.F. apparatus illustrated therein comprises generally a support 18 having a gap or space 19 therein, a die holder 20 mounted on support 18 and having a tapered cavity 21 therein which retains the tapered split die halves 11 and 12, a billet holder 22 positioned above die 10 and attached to die holder 20 by a tie down 23 and bolts 24, a die holder tie down 25 attached to structure 25′, a punch 26 having a reduced diameter end portion 27 which is driven into a cavity 28 of billet holder 22 by a ram 29 via a ram adaptor 30. The billet holder 22 may be of the solid or split type or can be constructed as part of the halves 11 and 12 of split die 10, if desired.

The die 10 as illustrated in FIG. 2 shows the flow impeding pin 16 positioned in the exhaust orifice of the die cavity and supported by each of the die halves 11 and 12 described above. A formed part or control surface 31 is shown within the cavities of die 10 and billet holder 22 with the end portion 27 of punch 26 being withdrawn from the billet holder cavity 28.

The formed part is removed by removing bolts 24 and holder tie down 23 whereby die 10 and billet holder 22 are removed by an ejector means (not shown) which is moved upwardly through space 19 of support 18 and the cavity 21 in die holder 20 below die 10, thus moving die 10 upwardly whereby the halves 11 and 12 are separated and the formed part removed, having a configuration of the cavities 13 and 14 of die 10.

It has thus been shown that this invention provides a means for controlling back pressure in three dimensional part extrusion in a split die while preventing flash and associated tooling wear, thereby producing substantially finished parts with lower forming pressure. This is accomplished by positioning a pin or other desirably shaped projection in the exhaust orifice of such a die and to locate the pin in such a position as to create back pressure in areas needed so that the material being extruded fully fills the die cavity without damage to either the formed part or the forming die.

Although a specific embodiment of this invention has been illustrated and described, modifications will become apparent to those skilled in the art, and it is intended to cover in the appended claims all such modifications as come within the true spirit and scope of the invention.

What we claim is:

1. An extrusion die for delivering a product in the form of a three dimensional part, said die being comprised of a pair of separatable halves, each of said halves being provided with a cavity on one surface thereof which defines the part to be produced when said surfaces of said halves are positioned in abutment with each other, said die being provided with an entry orifice through which material to be extruded is forced into the area defined by said cavities of said die halves and a discharge orifice through which pressure in said area is relieved, said discharge orifice being provided with flow impeding pin-like means positioned in a direction transverse to the flow of the material to be extruded, whereby the flow of material through said area is impeded and thus caused to fill the area defined by said cavities so as to produce a formed part having the configuration defined by said cavities of said die halves without producing excessive pressure buildup within the die.

2. The die defined in claim 1, wherein said discharge orifice is provided with a plurality of pin-like support holes, and wherein said pin-like means may be positioned in at least one of said support holes to impede the flow of material being extruded a greater amount in one portion of the area defined by said cavities thereof than in another portion of said area, whereby complete filling of various die cavity configurations is provided.

3. The die defined in claim 1, wherein said cavities are configured to define an aerodynamic control surface.

4. The die defined in claim 1, wherein said entry orifice is defined by a portion of each of said die halves.

5. The die defined in claim 1, wherein said discharge orifice is defined by a portion of each of said die halves.

6. The die defined in claim 1, wherein each of said die halves includes a tapered portion.

7. The die defined in claim 1, in combination with a high energy rate forming apparatus, said forming apparatus including means for supporting and retaining said die, and high energy rate means for forcing material to be extruded into said die.

8. The combination defined in claim 7, wherein said means for supporting and retaining said die includes a die holder having a cavity therein configurated to cooperate with tapered portions of said die halves.

9. The combination defined in claim 7, wherein said high energy rate means includes a punch means and a ram means adapted for driving said punch means.

10. The combination defined in claim 9, wherein said ram means is capable of driving said punch means with an energy rating of up to 42,500 inch pounds and at a velocity of 250 inches per second.

References Cited

UNITED STATES PATENTS

| 496,899 | 5/1893 | Rion et al. | 72—353 |
|---|---|---|---|
| 1,352,911 | 9/1920 | Paque | 72—354 |
| 2,899,053 | 8/1959 | Govan | 72—260 |
| 3,021,003 | 2/1962 | Bluck | 72—260 |

FOREIGN PATENTS 653,877  5/1951  Great Britain.

CHARLES W. LANHAM, *Primary Examiner.*

K. C. DECKER, *Assistant Examiner.*

U.S. Cl. X.R.

72—260, 352, 467